(12) United States Patent
David et al.

(10) Patent No.: US 7,299,383 B2
(45) Date of Patent: Nov. 20, 2007

(54) SECURITY METHOD MAKING DETERMINISTIC REAL TIME EXECUTION OF MULTITASK APPLICATIONS OF CONTROL AND COMMAND TYPE WITH ERROR CONFINEMENT

(75) Inventors: Vincent David, Versailles (FR); Jean Delcoigne, Maurepas (FR)

(73) Assignees: Commissariat a l'Energie Atomique, Paris (FR); Areva Np, Courbevoie (FR)

( * ) Notice: Subject to any disclaimer, the term of this patent is extended or adjusted under 35 U.S.C. 154(b) by 1065 days.

(21) Appl. No.: 10/416,564

(22) PCT Filed: Nov. 13, 2001

(86) PCT No.: PCT/FR01/03532

§ 371 (c)(1),
(2), (4) Date: Jun. 23, 2003

(87) PCT Pub. No.: WO02/39277

PCT Pub. Date: May 16, 2002

(65) Prior Publication Data

US 2004/0078547 A1    Apr. 22, 2004

(30) Foreign Application Priority Data

Nov. 13, 2000   (FR) ................................. 00 14555

(51) Int. Cl.
*G06F 11/00*   (2006.01)
(52) U.S. Cl. .......................................... 714/51; 714/39
(58) Field of Classification Search ................. 714/51, 714/39; 718/102; 707/205
See application file for complete search history.

(56) References Cited

U.S. PATENT DOCUMENTS 4,589,093 A *  5/1986  Ippolito et al. ............. 718/102

6,338,072 B1 *  1/2002  Durand et al. .............. 707/205

FOREIGN PATENT DOCUMENTS

FR    2 771 828 A      6/1999
FR    2771828 A  *    6/1999

OTHER PUBLICATIONS

David, V., et al.: "Safety properties ensured by the OASIS model for safety critical real-time systems," Computer Safety, Reliability and Security. 17th International Conference, SAFECOMP'98. Proceedings, Proceedings of 17th International Conference on Computer Safety, Reliability and Security, Heidelberg, Germany, Oct. 5-7, 1998, pp. 45-59.

(Continued)

*Primary Examiner*—Marvin Lateef
*Assistant Examiner*—Jeison Arcos
(74) *Attorney, Agent, or Firm*—Weingarten, Schurgin, Gagnebin & Lebovici LLP

(57) ABSTRACT

The method is implemented with a management system of the time-triggered architecture type in association with a processor of a central processor unit that possesses a privileged execution mode to which access is protected by an instruction of the "call to system layer" type. The only system layer call that is authorized from an application task under consideration to the system layer consists in reporting a change of node in the control graph of the task in question. When the system layer has verified that the call is legal relative to the execution paths of the control graph as described in the constant tables of the application, all of the operations to be performed on the node in question by the system layer are predetermined by the constant tables of the application associated with the system layer. Prior to real-time execution, pre-ordering of the lists of tasks of an application under consideration is performed in a micro-kernel, which subsequently ensures, when called by the system layer during real-time execution, that task lists are updated in ordered manner depending on the new time characteristics of the tasks, specifically their earliest start times d(i) and their latest finish times f(i) as calculated by the system layer.

13 Claims, 6 Drawing Sheets

OTHER PUBLICATIONS

Aussagues, C., et al: "Vérification de propriétés de sûreté dans le modèle OASIS pour les applications temps réel critiques," RTS '97 Salon Des Solutions Pour Les Systemes Temps Reel Et Les Applications Enfouies (RTS '97: Real Time Systems And Embedded Applications), 1997 pp. 145-164, Toulouse, France, Teknea, France.

Aussagues, C., et al.: "Guaranteeing timeliness in safety critical real-time systems," Distributed Computer Control Systems 1998 (DCCS'98) Proceedings Volume from the 15th IFAC Workshop, Proceedings of the 15th IFAC Workshop on Distributed Computer Control Systems 1998, Como, Italy, Sep. 9-11, 1998, pp. 83-89, Kidlington, UK, Elsevier Science, UK.

Aspelund, J., et al.: "A fault tolerant multimicroprocessor operating system modeled with locality Petri nets," Implementing Functions: Microprocessors and Firmware. Seventh Euromicro Symposium on Microprocessing and Microprogramming, Paris, France, Sep. 8-10, 1981, pp. 63-70, Amsterdam, Netherlands, North-Holland, Netherlands.

* cited by examiner

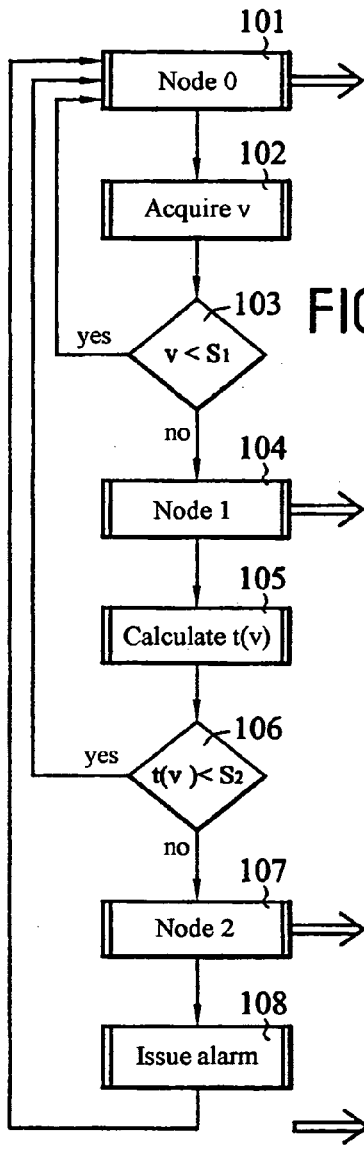
FIG.3
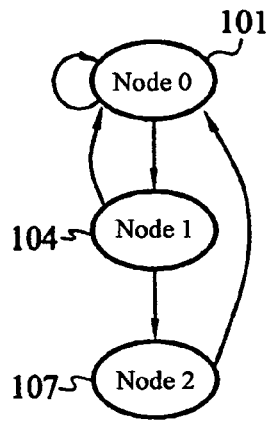
FIG.4
| Node | Value of δ for updating f(i) with f(i+1) = f(i) + δ | Update d(i) |
|---|---|---|
| 0 | 1 | yes: d(i+1) = f(i) |
| 1 | 2 | no: d(i+1) = d(i) |
| 2 | 1 | yes: d(i+1) = f(i) |
FIG.6
⇒ Call system layer
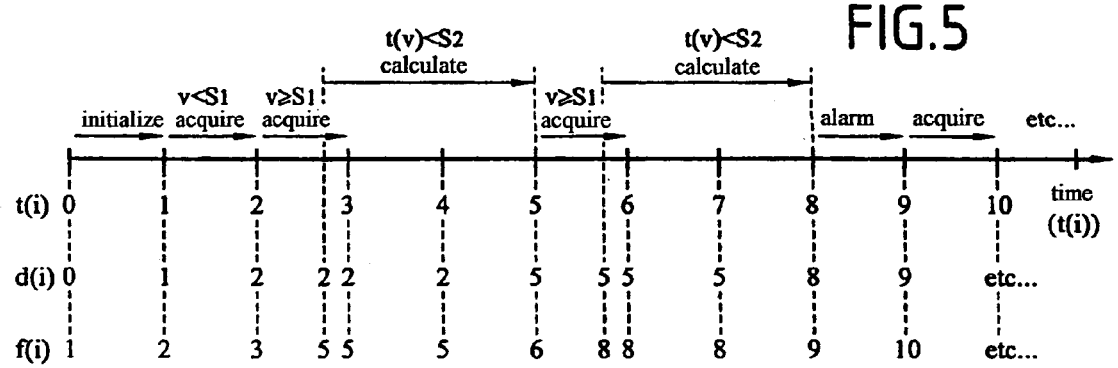
FIG.5

| Node | Value of δ for updating f(i) with f(i+1) = f(i) + δ | Update d(i) | Calculate visibility time dV |
|---|---|---|---|
| 0 | 1 | yes: d(i+1) = f(i) | no |
| 1 | 2 | no: d(i+1) = d(i) | no |
| 2 | 1 | yes: d(i+1) = f(i) | no |
| 3 | 0 | no: d(i+1) = d(i) | yes: dV = d(i) + 2 |

FIG.12

| Node | Value of δ for updating f(i) with f(i+1) = f(i) + δ | Update d(i) | Consume a message of time dV |
|---|---|---|---|
| 0 | 1 | yes: d(i+1) = f(i) | no |
| 1 | 0 | no: d(i+1) = d(i) | yes [ if $dV \geq d(i)$ ] |

FIG.13

|    |        | Application 301 | CS task 302 | other CS task 303 | micro-kernel 304 |
|----|--------|-------------|---------|---------------|--------------|
| CT | .const | C | C | R | R |
|    | .var   | M | C | R | R |
|    | .inst  | I | R | R | R |
| FT | .const | C | C | R | R |
|    | .var   | C | M | R | R |
|    | .inst  | I | R | R | R |
| BM | .const | C | C | C | R |
|    | .var   | C | M | C | R |
| ME | .const | R | C | C | R |
|    | .var   | R | M | C | R |
| VT | .const | C | C | C | R |
|    | .var   | C | M | C | R |
| PU | .var   | R | M | R | M |
| G  | .const | R | C | | C |
| CS | .const | R | C | | R |
|    | .inst  | R | I | | R |
| TR | .const | R | C | | C |
|    | .var   | R | M | | M |
|    | .inst  | R | I | | I |
| MN | .const | R | R | R | C |
|    | .var   | R | R | R | M |
|    | .inst  | R | R | R | I |
| RS | .const | R | R | R | R |
|    | .var   | R | R | R | R |
|    | .inst  | R | R | R | R |

FIG.14

SECURITY METHOD MAKING DETERMINISTIC REAL TIME EXECUTION OF MULTITASK APPLICATIONS OF CONTROL AND COMMAND TYPE WITH ERROR CONFINEMENT

The present invention relates to a security method for making deterministic the real time execution of multitask applications of the control and command type in a control system having at least a first clock which issues an interrupt signal whenever an adjustable quantity of time has elapsed, a central processor unit with at least one processor capable of receiving at least said clock interrupt signal, a main memory, and a set of peripheral controllers for managing the inputs/outputs of the control system.

In a system for multitask management of various processes (inputs/outputs, computations, . . . ) having different time scales and liable to exchange data, with all of the processes being synchronized and coordinated in real time, it is desirable to be capable of executing processes in real time in deterministic manner, i.e. with the overall behavior of all of the tasks that interact with one another and with the environment being unique and invariant. It is also desirable for the execution of real time processes to be made secure, i.e. for it to include detecting and confining anomalies in such a manner as to ensure that the various tasks are independent relative to failures, while nevertheless remaining as deterministic as possible in the presence of operating anomalies.

Numerous multitask management systems are already known. However, most of those management systems are asynchronous and therefore non-deterministic. In addition, such systems are of a design that does not prevent certain failure modes from propagating.

More particularly, document FR-A-2 771 828 discloses a security method for a multitask computer fitted with a failure detection system by time or space partitioning which, at all times, identifies the task that is executing legally.

According to that document, which relates to a system of the cyclical ordering type, partitioning is used to limit the propagation of failures, but there is then no longer any communication between partitions, i.e. there is no longer multitask management at an overall level. Furthermore, there is still a possibility of failures propagating within a partition, which means that maximum security is not available.

Document FR-A-2 771 828 thus shows that obtaining deterministic behavior appears to be contradictory with multitask management.

The present invention seeks to remedy the drawbacks of the prior art and makes it possible to obtain control systems that are more integrated, that provide better performance, and that are safer.

More particularly, the present invention seeks to make it possible to obtain secure multitask execution in real time and in deterministic manner by means of a computer, both with error confinement and with fault tolerance.

The invention thus seeks to make it possible to provide security that guarantees highly deterministic execution in real time of multitask applications, both for tasks that are cyclical and for tasks that are not cyclical, with communications that are explicit (time-stamped messages) and implicit (streams of time-stamped data).

These objects are achieved by a security method making real time execution of multitask applications of the control and command type in a control system deterministic, the method comprising:

at least a first clock that issues an interrupt signal sh whenever an adjustable quantity of time has elapsed;

a central processor unit (CPU) having at least one processor capable of receiving at least said clock interrupt signal sh;

a main memory; and a set of controllers for controlling peripherals for managing inputs/outputs of the control system, the method being characterized in that it comprises the following steps:

a) for each of the tasks of a given application, storing all of the chaining that is authorized from each time synchronization point of the task that requires a call to a system layer, said chaining being represented by a control graph for monitoring the execution of system layer calls made by the task in question, each control graph comprising a set of nodes each corresponding to a call to the system layer of the control system;

b) for each node of the control graph of each task, storing the nature of the call to the system layer and its call parameters, including time parameters enabling "earliest start" times $d(i)$ and "latest finish" times $f(i)$ to be updated;

c) for each task, storing an initial node in the associated graph;

d) for the given application and prior to starting real time execution in a time-triggered mode, initializing, for each task, the initial node and the initial instant representing the initial state of the task in question;

e) for the given application and prior to starting real time execution in a time-triggered mode, initializing the starting order of each of the tasks by pre-ordering lists of tasks in an atomic micro-kernel;

f) setting the first clock to issue a clock interrupt signal sh constituting a call to the micro-kernel, on the first instant of the application for starting execution of said application in time-triggered mode;

g) during normal operation after the first clock has been set, causing the first clock to be reset by the micro-kernel on each call to the micro-kernel; during a call to the micro-kernel by the system layer or by processing the interrupt signal sh, causing the micro-kernel to go to the step of updating the lists of tasks in ordered manner depending on the time characteristics of the tasks, namely their earliest start times $d(i)$ and their latest finish times $f(i)$; and after updating the list, causing the micro-kernel to calculate the nearest future instant on which a task needs to be woken up and causing the first clock to be set by the micro-kernel on the basis of said nearest future instant to wake up said task and leave the micro-kernel; and h) while executing a task, making a call to the system layer only when a node of the control graph of said task is reached, and passing as an argument the number of the node; proceeding on entry into the system layer with a check to verify whether, according to the control graph of the task being executed, the chaining from the node corresponding to the preceding system layer call is authorized, in order to launch anomaly processing in the system layer if said chaining is not authorized or to continue with execution if said chaining is authorized, updating the time parameters of the task being executed comprising the earliest start time $d(i)$ and the latest finish time $f(i)$ using calls to the micro-kernel from the system layer, and continuing normal execution of the current task until said task again reaches a node of its control graph.

More particularly, the security method of the invention is applied to a control system further comprising a memory protection unit for controlling addressing access rights, which memory protection unit responds to a requested address ad supplied by the CPU and to the rights of the execution context of the processor to access the addressable memory space, by producing in exclusive manner either a validated address av giving access, or else issuing an exception signal se to the CPU indicative of authorized addressing, and in that it further comprises the following steps:

i) during a preparatory stage, for a given application, storing the access rights to each of the memory segments for the micro-kernel and for each application task and for the extension of each task in the system layer so as to constitute first and second execution contexts depending on whether the instructions are in the code specific to the application constituting the task or the instructions are located in generic code of the system layer constituting the extension of the task in the system layer;

j) for a given application and prior to starting real time execution in a time-triggered operating mode, initializing the micro-kernel context and the first and second execution context for each task and for its extension in the system layer; and k) during execution of a task, making a call to the system layer using an instruction for passing into a privileged mode of execution which makes it possible to pass from the execution context of the task to the execution context of its extension in the system layer, and after verifying that chaining from the node corresponding to the preceding system call is authorized, and after updating the time parameters of the task using calls to the micro-kernel from the system layer, returning to the code of the task by means of an instruction for returning into the non-privileged mode enabling execution to pass from the execution context of the extension in the system layer to the execution context of the task.

Preferably, the execution contexts of each application task are disjoint in pairs.

According to a particular characteristic of the method of the invention, the extensions of the execution contexts of the application tasks into the system layer are not write accessible to the execution contexts of the tasks in the application code.

The coding of the control graph of a task prevents any failure of common cause occurring both in the mechanism for controlling execution of any task of the application and in the execution of said task itself.

The method of the invention may further comprise the following steps:

l) during a preparatory stage, for each given application, and for all of the authorized chainings in said task, storing a time quota constituting a supremum for the maximum execution time needed for going from one node to the other in the control graph of the task, each of these time quotas covering both the time passed in executing the instructions specific to the task, and also the time passed in executing the generic code of the system layer in the extension of the task; and m) during normal operation, after the first clock has been set, in the event of a call to the micro-kernel triggered by the time interrupt signal sh and causing the first clock to be reset, checking to verify whether the time interrupt signal sh triggering the call to the micro-kernel is associated with an attempt at violating a time quota, and if so, causing the micro-kernel to run anomaly processing, else if the time interrupt signal sh is not associated with an attempt to violate a time quota, causing the micro-kernel to update the task lists, and after updating the task lists, to calculate both the nearest future instants at which a task needs to be woken up and the future instants at which the quota of time allocated to the task that will be executing on exiting the micro-kernel will have expired, which time is determined while updating the lists, and causing the micro-kernel to set the first clock to the nearer of said future instants so that either the task is woken up or else an attempt at violating time quota due to anomalous operation is detected, and leaving the micro-kernel after setting the first clock.

When a second clock is implemented in the control system, and according to a particular characteristic of the invention, the micro-kernel is caused to access the second clock in order to monitor the flow of time as triggered by the first clock by comparing the time signals.

The security method of the invention adapted to make deterministic the real time execution of communicating multitask applications of the control and command type may further comprise the following steps:

n) during a preparatory stage, for each of the tasks of a given application storing all of the authorized chainings of its points for time synchronization and for communication with the other tasks of the application requiring a call to the system layer, these authorized chaining being represented by a control graph for the execution of system layer calls made by the task in question, each graph comprising a set of nodes, each corresponding to a call to the system layer;

o) storing each buffer zone needed for exchanging data between tasks, specifying its size, the size of the elements that it contains, its location or base address, and also the relationships between the buffer zones enabling the information transfers needed for communications to be confirmed;

p) storing, for each buffer zone, the initial values of its elements;

q) for the given application and prior to starting real time execution in a time-triggering operating mode, initializing the values of the elements of the buffer zone with values previously stored in memory; and r) during execution of a task, while making a system layer call when a node of the task control graph is reached and after verifying that according to the control graph of the task currently being executed the chaining from the node corresponding to the preceding system layer call is authorized, causing buffer zones to be updated in succession as a function of the nature of the previously-stored call and performing incremental updates as necessary of the time parameters of the task being executed, comprising its earliest start time d(i) and its latest finish time f(i).

According to a particular characteristic of the invention, in the system layer, only the buffer zones are allowed to be shared by the extensions of the execution contexts of the tasks of an application, a given buffer zone for dynamic communications corresponding to sending messages being sharable only by two task execution context extensions, while a given buffer zone for static communications corresponding to a stream of time-stamped data can be shared by more than two task execution context extensions, but can be modified only by the task owning the context extension in the system layer.

The security method of the invention is applicable to control and command applications which are highly critical concerning safety.

In particular, the method of the invention may be applied to a control and command system of safety class level 1E, for a nuclear reactor.

Other characteristics and advantages of the invention appear from the following description of particular embodiments, given as examples with reference to the accompanying drawings, in which:

FIG. 3 is a flow chart corresponding to processing an example of a real time task in the security method in accordance with the invention;

FIG. 4 is a control graph corresponding to the flow chart of FIG. 3;

FIG. 5 is an example of a timing chart and of associated time values while processing the example of FIGS. 3 and 4 of a real time task using the safety method in accordance with the invention;

FIG. 6 is a table of the nodes of the FIG. 4 control graph, including a description of the operations to be performed on the earliest start times $d(i)$ and the latest finish times $f(i)$;

Figure 8:
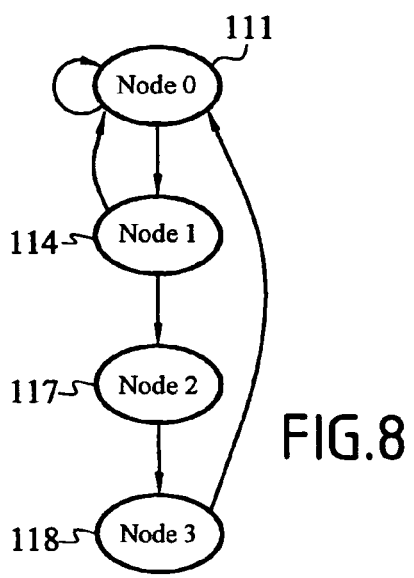
FIG. 8 is a control graph corresponding to the flow chart of FIG. 7.
Figure 10:
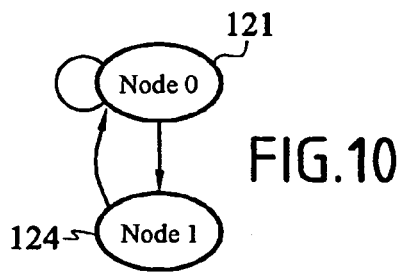
FIG. 10 is a control graph corresponding to the flow chart of FIG. 9.

FIGS. 12 and 13 are tables of the nodes of the control graphs of FIGS. 8 and 10 including descriptions of the operations to be performed on the messages at the earliest start times $d(i)$ and the latest finish times $f(i)$; and FIG. 14 is a detailed table showing the processor's access rights to memory segments in an example of the method of the invention and depending on whether it is executing a task, the system layer, or the micro-kernel.

Figure 1:
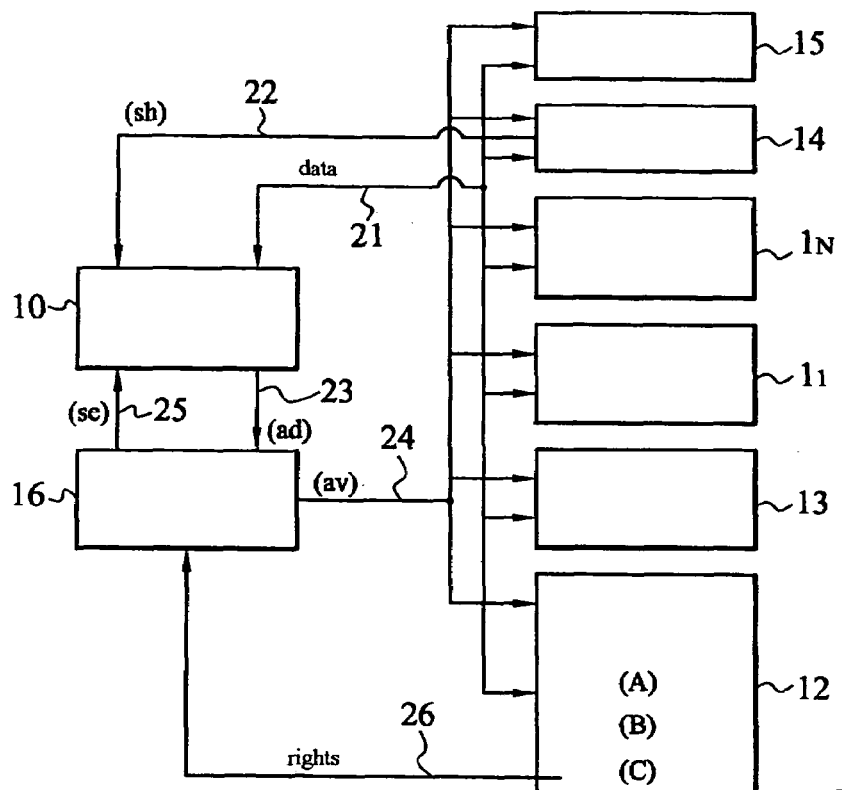
FIG. 1 is a simplified diagram of the architecture of a control system to which the safety method of the invention is applicable.

The description begins with reference to FIG. 1 which shows an example of architecture of simplified type for a control system to which the security method of the invention is applicable.

The control system comprises at least a first clock 14 which transmits an interrupt signal sh over a line 22 whenever a programmable quantity of time has elapsed. A central processor unit (CPU) 10 has at least one processor capable of receiving data over a line 21 and the interrupt signal sh over the line 22.

The CPU 10 serves to send out address signals over lines 23, 24 to a main memory comprising both read-only memory (ROM) 12 and random access memory (RAM) 13.

The ROM 12 contains at least information (A) comprising the programs of the application concerned and information (B) comprising the constant tables and data of the application.

The RAM 13 contains the working variable data of the application programs.

Controllers $1_1$ to $1_N$ of peripherals 1 to N serve to provide real time management of inputs and outputs of the control system.

A second clock 15 may be implemented to provide additional monitoring of proper operation of the clock 14.

The control system may further comprise a memory protection unit 16 for enforcing addressing access rights.

Starting from a requested address ad supplied by the CPU 10 to the memory protection unit 16 over the line 23 and from the rights (D) of the various execution contexts of the processor to access the addressable memory space, as supplied by a line 26 connecting the ROM 12 to the memory protection unit 16, said memory protection unit 16 produces in exclusive manner either a validated address av giving access over the line 14 connected to the memories 12 and 13, to the peripheral controllers $1_1$ to $1_N$, and to the clocks 14 and 15, or else an exception signal sc over a line 25 to the CPU 10 indicating that the addressing is not authorized.

The memory protection unit 16 may be constituted by a mechanism present in a standard memory management unit (MMU), which MMU can itself be incorporated in the processor of the CPU 10.

The processor of the CPU 10, which is capable of receiving at least one clock interrupt signal sh and an exception signal se flagging non-authorized addressing, possesses a privileged mode of execution to which access is protected by an instruction of the "call to system layer" type, which may be constituted, for example, by a branch instruction or "trap".

In general, the invention relates to a management system of the type having time-triggered architecture (TTA) for secure deterministic multitasking in real time with explicit communication (time-stamped messages) and implicit communication (streams of time-stamped data), the tasks themselves being either cyclical or non-cyclical.

More particularly, in the security method in accordance with the invention, calls to the system layer of the control system (by means of a call to privileged mode execution) are managed in specific manner, which makes it possible to detect and to find errors and to guarantee that behavior is deterministic and predictable.

In the invention, calls to the system layer are managed as follows:

i/ the only system layer calls that are authorized from an application task in question to the system layer are calls that consist in reporting a change of node in the control graph of the task in question;

ii/ the system layer then verifies that each call is legal when compared with the execution path of the control graph which is described in the constant tables of the application; and iii/ when the call is legal, all of the operations to be performed on the node in question by the system layer are predetermined by the constant tables of the associated application of the system layer.

Lists of tasks of an application in question are preordered prior to real time execution on an atomic micro-kernel which, when subsequently called by the system layer during real time execution, serves to update the lists of tasks in ordered manner in application of the new time characteristics of the tasks, specifically their earliest start times $d(i)$ and their latest finish time $f(i)$ as calculated by the system layer.

The basic security method of the invention essentially comprises the following steps:

a) for each of the tasks of a given application, storing all of the chaining that is authorized from each time synchronization point of the task that requires a call to a system layer, said chaining being represented by a control graph for monitoring the execution of calls to the system layer from the task in question, each control graph comprising a set of nodes each corresponding to a call to the system layer of the control system;

b) for each node of the control graph of each task, storing the nature of the call to the system layer and its call parameters, including time parameters enabling "earliest start" times d(i) and "latest finish" times f(i) to be updated;

c) for each task, storing an initial node (Node 0) in the associated graph;

d) for the given application and prior to starting real time execution in a time-triggered mode, initializing, for each task, the initial node (Node 0) and the initial instant representing the initial state of the task in question;

e) for the given application and prior to starting real time execution in a time-triggered mode, initializing the starting order of each of the tasks by pre-ordering lists of tasks in an atomic micro-kernel;

f) setting the first clock 14 to issue a clock interrupt signal sh constituting a call to the micro-kernel, on the first instant of the application for starting execution of said application in time-triggered mode;

g) during normal operation after the first clock 14 has been set, causing the first clock 14 to be reset by the micro-kernel on each call to the micro-kernel; during a call to the micro-kernel by the system layer or by processing the interrupt signal sh, causing the micro-kernel to go to the step of updating the lists of tasks in ordered manner depending on the time characteristics of the tasks, namely their earliest start times d(i) and their latest finish times f(i); and after updating the list, causing the micro-kernel to calculate the nearest future instant on which a task needs to be woken up and causing the first clock 14 to be set by the micro-kernel on the basis of said nearest future instant to wake up said task and leave the micro-kernel; and h) while executing a task, making a call to the system layer only when a node of the control graph of said task is reached, and passing as an argument the number of the node; proceeding on entry into the system layer with a check to verify whether, according to the control graph of the task being executed, the chaining from the node corresponding to the preceding system layer call is authorized, in order to launch anomaly processing in the system layer if said chaining is not authorized or to continue with execution if said chaining is authorized, updating the time parameters of the task being executed comprising the earliest start time d(i) and the latest finish time f(i) using calls to the micro-kernel from the system layer, and continuing normal execution of the current task until said task again reaches a node of its control graph.

As mentioned above, the control system to which the security method of the invention is applied may include a memory protection unit and tables of the rights of each context to access each of the segments, which access rights are predetermined and may, where appropriate, be stored in ROM. For each execution context, the description of the table defining the rights of the context is initialized only once, during the stage of initializing the entire system, and after this system initialization stage, none of the processes executed on the CPU has those tables in its execution context.

The security method of the invention can then further comprise the following steps which take place amongst the steps defined above:

i) during a preparatory stage, for a given application, storing the access rights to each of the memory segments for the micro-kernel and for each application task and for the extension of each task in the system layer so as to constitute first and second execution contexts depending on whether the instructions are in the code specific to the application constituting the task or the instructions are located in generic code of the system layer constituting the extension of the task in the system layer;

j) for a given application and prior to starting real time execution in a time-triggered operating mode, initializing the micro-kernel context and the first and second execution context for each task and for its extension in the system layer; and k) during execution of a task, making a call to the system layer using an instruction for passing into a privileged mode of execution which makes it possible to pass from the execution context of the task to the execution context of its extension in the system layer, and after verifying that chaining from the node corresponding to the preceding system call is authorized, and after updating the time parameters of the task using calls to the micro-kernel from the system layer, returning to the code of the task by means of an instruction for returning into the non-privileged mode enabling execution to pass from the execution context of the extension in the system layer to the execution context of the task.

The security method of the invention may also refer to time quotas and can then further include the following steps which take place amongst the above-defined steps of the basic method and of the basic method as modified to take account of the existence of privileged modes of execution that make it possible to go to an execution context of the extension of a task in the system layer:

l) during a preparatory stage, for each given application, and for all of the authorized chainings in said task, storing a time quota constituting a supremum for the maximum execution time needed for going from one node to the other in the control graph of the task, each of these time quotas covering both the time passed in executing the instructions specific to the task, and also the time passed in executing the generic code of the system layer in the extension of the task; and m) during normal operation, after the first clock 14 has been set, in the event of a call to the micro-kernel triggered by the time interrupt signal sh and causing the first clock 14 to be reset, checking to verify whether the time interrupt signal sh triggering the call to the micro-kernel is associated with an attempt at violating a time quota, and if so, causing the micro-kernel to run anomaly processing, else if the time interrupt signal sh is not associated with an attempt to violate a time quota, causing the micro-kernel to update the task lists, and after updating the task lists, to calculate both the nearest future instants at which a task needs to be woken up and the future instants at which the quota of time allocated to the task that will be executing on exiting the micro-kernel will have expired, which time is determined while updating the lists, and causing the micro-kernel to set the first clock 14 to the nearer of said future instants so that either the task is woken up or else an attempt at violating time quota due to anomalous operation is detected, and leaving the micro-kernel after setting the first clock 14.

The procedure for updating the task lists of the application in the micro-kernel can be made more explicit in the manner specified below, which takes account of a preferred implementation in which reference is made to a time quota allocated to the task being processed, but can also be applied to a simplified basic implementation if reference to a time quota is omitted.

For each call to the micro-kernel during execution, whatever the system layer extension of the execution context of the task in question, two parameters are involved in updating the task lists: the earliest start time d(i) and the latest finish time f(i). Two task lists are managed: the list of eligible tasks ready for execution, i.e. having earliest start times d(i) in the past, and the list of non-eligible tasks, that are not ready for execution or that are waiting to be woken up, i.e. tasks having earliest start times d(i) in the future. The list of eligible tasks is ordered in order of increasing latest finish times; the list of non-eligible tasks is ordered in order of increasing earliest start times d(i). Every waiting task is guaranteed to go to the "ready" state once its earliest start time is reached.

α) If, during a call to the micro-kernel, the earliest start time d(i) of a task is in the future, the task is not eligible and it is therefore transferred to the ordered list of non-eligible tasks. This time makes it possible to calculate the future instant at which the task ought to be woken up on the basis of the order of earliest start times: the nearest future earliest start time gives the future instant at which the next task in question will become eligible (to be woken up).

β) If, on the contrary, during a call to the micro-kernel, the earliest start time d(i) of the task in question is in the past, then the task is eligible and it is transferred to the ordered list of eligible tasks. The micro-kernel then gives control to the eligible task having the nearest future latest finish time in the ordered list of latest finish times, and it calculates the future instant from which the time quota allocated to the elected task will expire (where the quota is the difference between the nearest future latest finish time and the present instant).

γ) Nevertheless, if the call to the micro-kernel is caused by the clock 14 in the event of being set for the time quota allocated to the task currently being processed, then the micro-kernel begins by executing the anomaly processing action specified by the application, after which it performs actions α) and β).

On the basis of these two instants (the nearest future time for waking up a task and the future time at which the quota of time allocated to the elected task expires), the micro-kernel then sets the clock 14 in such a manner that it is activated at the nearest of those two instants (either to wake up a task at the proper time, or else to detect an attempt at violating time quota, i.e. anomalous operation). With the clock 14 set, the micro-kernel is excited, possibly with switching.

Thus, during execution, the active task is changed either by a time interrupt, or following a change of node in the active task.

The origin of a time interrupt may either be the fact that a waiting task has become ready (given the time triggering), or else that the active task has used up the quota of time allocated to it, in which case a safety check is performed.

When the active task changes node in its control graph, either its latest finish time is pushed back, or else its earliest start time is pushed back. In the first case, some other task can become active, taking its place. In the second case, the active task is put into the set of waiting tasks if its new earliest start time is in the future.

The number of preemptions is finite and bounded and it is possible analytically to calculate the maximum bound of the number of preemptions.

Furthermore, insofar as time quotas are updated and monitored on each change of node, it is possible to detect anomalies in time in order to confine the task immediately.

Insofar as only legal displacements through the control graph are accepted, it is impossible for a task to present behavior in time that leads to it consuming more resources (e.g. memory resource for communications) than that which has been statistically evaluated using the same graph.

An implementation of the security method of the invention is described below with reference to FIGS. 3 to 6 for a particular real time task.

In this example, the function of the real time task is to issue an alarm if a measured value is such that v exceeds a threshold $s_1$ over a duration t(v) which itself exceeds a threshold $s_2$.

FIG. 3 is a flow chart showing the processing of the task corresponding to the above example.

Reference 101 designates an initial node or Node 0, at which a call is made to the system layer.

Reference 102 corresponds to a first step of acquiring the measured value v.

Reference 103 corresponds to making a test, after which the process returns to the initial node 101 followed by the step 102 if $v<s_1$, or else moves on to Node 1, referenced 104, followed by step 105 if $v \geq s_1$.

At node 104, a call is made to the system layer, and at step 105, the duration t(v) is calculated.

After step 105, a test 106 serves to return to the initial node 101 if $t(v)<s_2$, and to move on to Node 2, referenced 107, if $t(v) \geq s_2$.

After the second node 107, where a call is made to the system layer, the process moves on to step 108 of issuing an alarm, after which it returns to the initial node 101.

FIG. 4 is the control graph having nodes 101, 104, and 107 together with the associated arcs that correspond to the flowchart of FIG. 3.

In this example, the time allocated for performing the operations for "acquiring v" (step 102), for "calculating t(v)" (step 105), and for "issuing an alarm" (step 108), are as follows:

| | |
|---|---|
| acquisition step 102: | 1 time unit |
| calculation step 105: | 2 additional time units |
| alarm issuing step 108: | 1 time unit |

For each of nodes 101, 104, and 107, the services provided by the system layer and the operations performed on the earliest start times d(i) and the latest finish times f(i) are given in the table below, it being understood that during initialization, an earliest start time d(0) is given such that d(0)=0, and a latest finish time f(0) is given such that f(0)=1 time unit.

| Node | Services provided by the system layer | Operations performed on d (i) and f (i) |
|---|---|---|
| 1/ Node 0 | i) wait for the end of the previously fixed time<br>ii) then adjust the new time | f (i + 1) = f (i) + 1<br>d (i + 1) = f (i) |
| 2/ Node 1 | adjust the new time | f (i + 1) = f (i) + 2<br>d (i + 1) = d (i) |
| 3/ Node 2 | i) wait for the end of the previously fixed time<br>ii) then adjust the new time | f (i + 1) = f (i) + 1<br>d (i + 1) = f (i) |

FIG. 6 summarizes a table of Nodes 0, 1, and 2 and includes descriptions of the operations to be performed on the earliest start time d(i) and the latest finish time f(i).

Furthermore, the task control graph shown in FIG. 4 can be encoded in matrix form, in which case it is presented as follows for the above-specified example:

$$M = \begin{array}{c} 0 \\ 1 \\ 0 \end{array} \begin{pmatrix} \text{Node} & 0 & 1 & 2 \\ A & A & I \\ A & I & A \\ A & I & I \end{pmatrix} \quad (I)$$

where:

$m_{ij}=A$ if the move from Node i to Node j is authorized;
$m_{ij}=I$ if the move from Node i to Node j is inhibited.

FIG. 5 is a timing chart showing an implementation of the above-described real time task, showing the associated time values. Numbers 1 to 10 designate real time in numbers of time units since the start of operation in time-triggered mode.

The security method of the invention is also adapted to ensure that the real time execution of multitasking applications communicating with one another by messages is made deterministic.

Under such circumstances, the method includes the following particular steps which take place amongst the steps described above for a basic method with multitasking applications without communication between tasks being indicated:

n) during a preparatory stage, for each of the tasks of a given application storing all of the authorized chainings of its points for time synchronization and for communication with the other tasks of the application requiring a call to the system layer, these authorized chaining being represented by a control graph for the execution of system layer calls made by the task in question, each graph comprising a set of nodes, each corresponding to a call to the system layer;

o) storing each buffer zone needed for exchanging data between tasks, specifying its size, the size of the elements that it contains, its location or base address, and also the relationships between the buffer zones enabling the information transfers needed for communications to be confirmed;

p) storing, for each buffer zone, the initial values of its elements;

q) for the given application and prior to starting real time execution in a time-triggering operating mode, initializing the values of the elements of the buffer zone with values previously stored in memory; and r) during execution of a task, while making a system layer call when a node of the task control graph is reached and after verifying that according to the control graph of the task currently being executed the chaining from the node corresponding to the preceding system layer call is authorized, causing buffer zones to be updated in succession as a function of the nature of the previously-stored call and performing incremental updates as necessary of the time parameters of the task being executed, comprising its earliest start time d(i) and its latest finish time f(i).

When the first and second execution contexts are defined for each task of the application and for its extension into the system layer, the following particular features also apply:

In the system layer, only the buffer zones are allowed to be shared by the extensions of the execution contexts of the tasks of an application, a given buffer zone for dynamic communications corresponding to sending messages being sharable only by two task execution context extensions, while a given buffer zone for static communications corresponding to a stream of time-stamped data can be shared by more than two task execution context extensions but can be written to or modified by a single context only.

An implementation of the security method of the invention involving two real time tasks that communicate by means of messages is described below with reference to FIGS. 7 to 13.

In this simple example, the function performed consists in switching on an alarm lamp if a measured value v is such that v exceeds a threshold $s_1$, and if the duration t(v) that the threshold $s_1$ has been exceeded by the measured value v, itself exceeds a threshold $s_2$.

One processing task thus acquires v and, if necessary, sends a message to an alarm task which switches ON the specified lamp.

Figure 7:
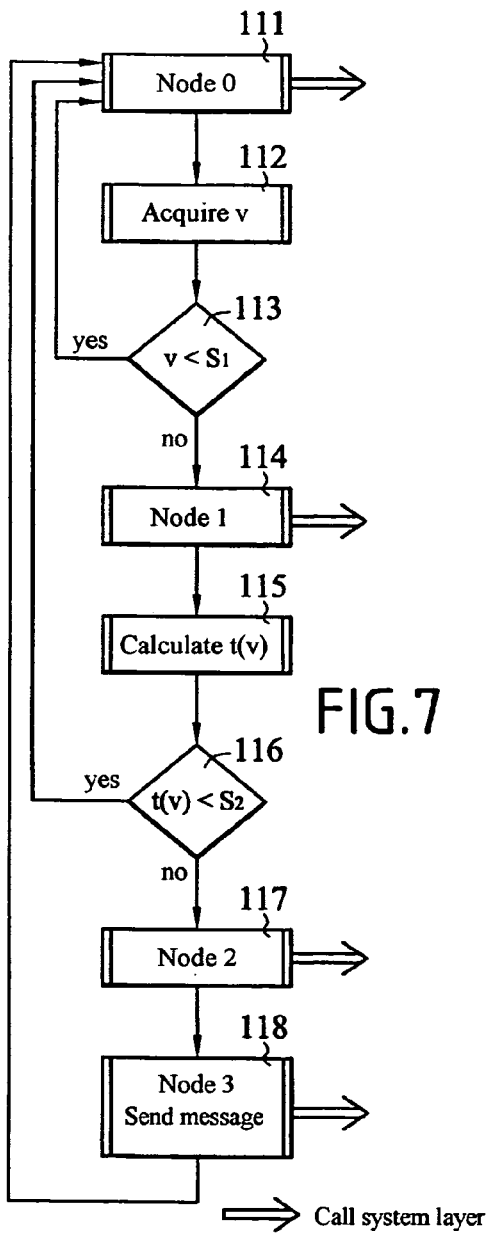
FIG. 7 is a flow chart corresponding to processing an example of a first real time task for communicating with a second task using the security method in accordance with the invention.

FIG. 7 is a flow chart corresponding to executing the processing task in this example.

Reference 111 designates the initial node or Node 0 at which a call is made to the system layer.

The first step 112 is a step of acquiring the measured value v and it is associated with a test 113 which compares the value v with the threshold $s_1$.

If $v<s_1$, then the task returns to the initial mode 111, else if $v \geq s_1$, the task moves on to Node 1, given reference 114, and giving rise to a call to the system layer.

The second step 115, following node 114, corresponds to calculating the duration t(v).

The test 116 associated with step 115 compares the duration t(v) with the threshold $s_2$.

If $t(v)<s_2$, then the task returns to the initial node 111, else if $t(v) \geq s_2$, then the task moves on to Node 2, which is referenced 117, and gives rise to a call to the system layer.

After node 117, the task moves on to Node 3 referenced 118 where a call is made to the system layer, and a third step is performed which consists in sending an alarm message, prior to returning to the initial node 111.

FIG. 8 shows the control graph corresponding to the flow chart of FIG. 7, with the nodes and the authorized arcs.

Figure 9:
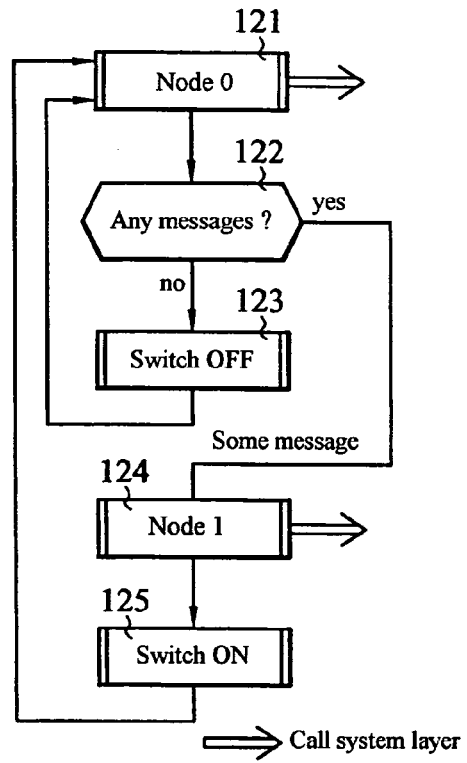
FIG. 9 is a flow chart corresponding to processing an example of a second real time task for communicating with the first real time task shown in the flow chart of FIG. 7.

FIG. 9 shows the flow chart corresponding to executing the alarm task in this example.

Reference 121 designates the initial node or Node 0 at which a call is made to the system layer.

A test 122 examines whether a message has been received.

If no message is present, then the task moves on to step 123 of switching OFF the alarm lamp, after which it returns to the initial node 121.

If one or more messages are present, then the task goes to Node 1, referenced 124, with a call to the system layer and then passes on to a step 125 of switching ON the alarm lamp, prior to returning to the initial node 121.

FIG. 10 shows the control graph corresponding to the flow chart of FIG. 9, with its nodes and its authorized arcs.

In this example, the times allowed for performing the operations: "acquire v"; "calculate t(v)"; "send message"; "switch OFF"; "switch ON"; corresponding respectively to steps 112, 115, 118, 123, and 125 are as follows:

| | |
|---|---|
| "acquire v": | 1 time unit |
| "calculate t (v)": | 2 additional time units |
| "send message": | 1 time unit, but the message will be available in 2 time units |
| "switch OFF": | 1 time unit |
| "switch ON": | 1 time unit |

The services given by the system layer and the operations performed on the earliest start times d(i) and the latest finish times f(i) (it being understood that d(0)=0 and f(0)=1) together with the time dV at which messages become visible are given below for each node of each of the two tasks.

| Node | Services rendered by the system layer | Operations performed on d (i), f (i), and dV |
|---|---|---|
| (Processing task) | | |
| Node 0 (111) | Wait for the end of the previously fixed time Then adjust new time | f (i + 1) = f (i) + 1; d (i + 1) = f (i) |
| Node 1 (114) | Adjust the new time | f (i + 1) = f (i) + 2; d (i + 1) = d (i) |
| Node 2 (117) | Wait for the end of the previously fixed time Then adjust the new time | f (i + 1) = f (i) + 1; d (i + 1) = f (i) |
| Node 3 (118) | Copy the message in the send zone of the extension of the task context in the system layer | f (i + 1) = f (i); d (i + 1) = d (i) dV = d (i) + 2 |
| (Alarm task) | | |
| Node 0 (121) | Wait for the end of the previously fixed time Then adjust new time Copy visible messages from the send zone of the treatment task into the receive zone of the extension of the task context in the system layer | f (i + 1) = f (i) + 1 d (i + 1) = f (i) |
| Node 1 (124) | Make a note in the receive zone of the extension of the task context in the system layer, that the first message has been consumed. | f (i + 1) = f (i) d (i + 1) = d (i) |

FIGS. 12 and 13 relate respectively to the processing task and to the alarm task of this example, and comprise tables of nodes with descriptions of the operations to be performed on the earliest start time d(i), the latest finish time f(i), and the visibility time dV.

The control graphs of the processing task and of the alarm task can be encoded in matrix form as follows:

$$M = \begin{matrix} \text{Node} & 0 & 1 & 2 & 3 \\ 0 \\ 1 \\ 2 \\ 3 \end{matrix} \begin{pmatrix} A & A & I & I \\ A & I & A & I \\ I & I & I & A \\ A & I & I & I \end{pmatrix} \quad \text{(2) (processing task)}$$

$$M = \begin{matrix} \text{Node} & 0 & 1 \\ 0 \\ 1 \end{matrix} \begin{pmatrix} A & A \\ A & I \end{pmatrix} \quad \text{(3) (alarm task)}$$

where:

$m_{ij}$=A if the move from Node i to Node j is authorized;

$m_{ij}$=I if the move from Node i to Node j is inhibited.

Figure 11:
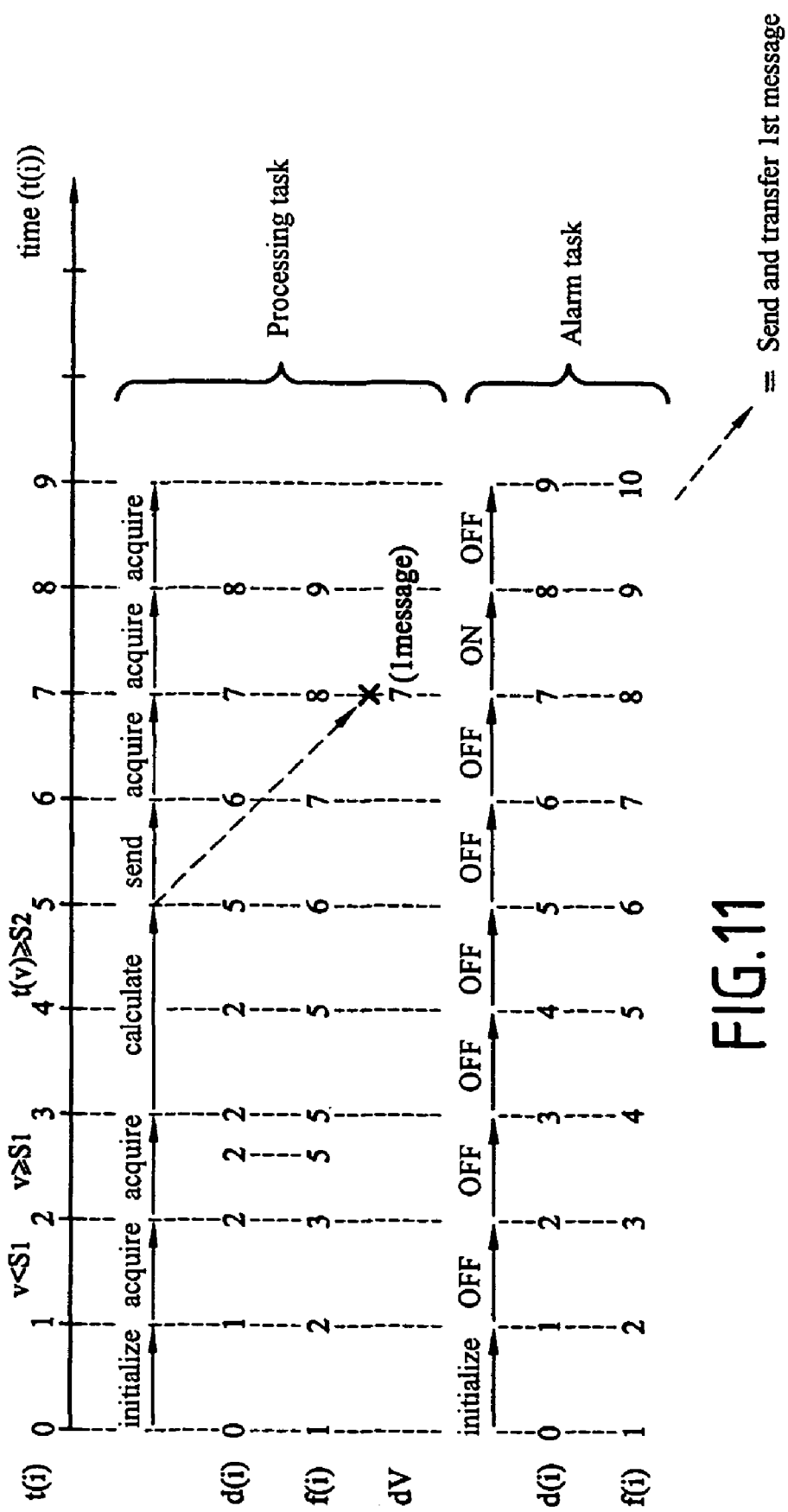
FIG. 11 is an example of a timing chart and of associated time values while processing the example of intercommunicating real time tasks shown in FIGS. 7 to 10 using the security method in accordance with the invention.

FIG. 11 is a timing chart showing an implementation of the two above-described communicating tasks, showing the associated time values. Numbers 1 to 10 specify real time in number of time units since the beginning of operation in time-triggered mode.

Only one type of message is stored in a given message queue. A message visibility time dV is associated with each message sent. The time dV specifies the future instant from which the destination can consume the message. Messages are consumed in order of visibility time dV, then in order of sender name, and finally in send order, thus making it possible to order messages fully for consumption purposes.

For each message queue, there exists a send zone in the context of each sender and a receive zone for the owner of the message queue concerned.

Since each producer (sender) has a send zone, there is no problem of conflict between two messages being sent by two different tasks.

Furthermore, as mentioned above, segmenting the memory makes it possible for the impact of a failure of a task to be restricted to its own memory space. Failure propagation from one task to other tasks in the application is thus impossible.

The use of memory segmentation also makes it possible to obtain the following property: within a time interval of the time triggering (TT) of a task, the execution context of the task is invariant between the beginning of a new instruction and the end of the preceding instruction.

Memory segmentation is applied to the system layer itself so as to partition it internally and thus partition the micro-kernel from the remainder of the system layer.

The memory protection unit 16 constitutes the hardware mechanism which makes it possible to enforce memory segmentation from the physical architecture point of view.

Figure 2:
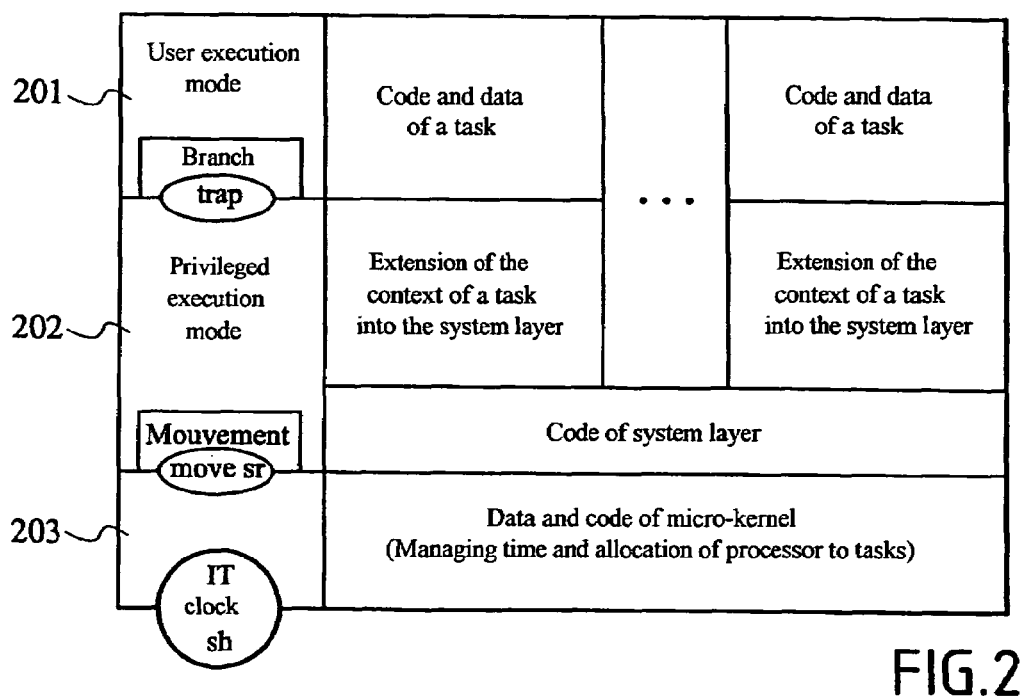
FIG. 2 is a diagram showing how code is distributed in depth relative to a system layer and to a micro-kernel in the method in accordance with the invention.

FIG. 2 shows the resulting distribution of code depth going from application level with user execution mode 201 (i.e. non-privileged mode) up to the micro-kernel 203, passing via the system layer 202, with privileged execution mode.

Access to the system layer 202 with privileged execution mode is protected by a "trap" type branch instruction, while passage from the system layer 202 to the micro-kernel 203 is triggered by a move type instruction.

The clock 14 provides time triggering and issues a clock interrupt signal sh whenever a programmable quantity of time has elapsed.

FIG. 2 thus shows the code and the data of the various tasks at application level 201, whereas in system layer level 202 there can be found the extensions of task contexts into the system layer and also the code of the system layer. In micro-kernel level 213, there can be found the data and the code of the micro-kernel for managing the allocation of the processor to the task, and for managing time.

Reference is now made to FIG. 14 which is a detailed table showing the rights of the various segments in an implementation of the security method of the invention to segmented memory.

As mentioned above, a multitask application comprises specific code, tasks, streams of time variables, message boxes, a system layer for transferring information between tasks, a graph executor which monitors movements of tasks in the application code, and a micro-kernel for managing time and processor sharing.

The memory is subdivided into segments having access rights that depend on the execution context of the processor.

To understand the table of FIG. 14, the following definitions apply:

.inst: a set of consecutive instructions in memory;

.const: a set of consecutive data items of constant values;

.var: a set of consecutive data items modifiable by instructions:
I: entitled to execute the instructions of the segment;
M: entitled to modify and consult the segment;
C: access rights to the segment restricted to consultation (read-only);
R: access to the segment is refused.

The segments are grouped together in zones depending on whether they are application-specific or linked with the model of the invention to the CPU 10 and its processor.

For each task, there are successive application zones CT, FT, BM, ME, VT, and PU. These application zones are described as follows:

Task Calculation Zone CT:
.const and .var: task data including its stack in non-privileged mode;
.inst: task calculations.

Task Operating Zone FT:
.const: description of the operation of the task (execution graph, node descriptions, due times, time increments as calculated by the CPU, . . . );
.var: zone for passing arguments to the system layer;
.inst: functions requesting a change of node from the system layer.

Message Box Zone BM:
.const: the characteristics of each message box of the task, including connections to the send zones (zones ME);
.var: all of the messages that are accessible to the task at the present instant.

Message Storage Zone ME:
.const: the descriptions of storage zones for messages sent by the task and not visible to destination tasks;
.var: the storage zones themselves.

Time Variable Zone VT:
.const: the descriptions of storage zones for the task, the values of the streams of time variables visible to the task including connections to the zones that produce the values;
.var: storage zones for the task for visible values that have been passed.

Zone PU:
.var: temporary working data needed by the processor, the current context of the task, the privileged mode stack.

There is also a global application zone common to all of the tasks, and described as follows:

Global Zone G:
.const: descriptions of the global constants of the application (number of tasks, references of task descriptors, descriptions of clocks, . . . ) and the constants providing an interface with the system layer.

The system layer itself comprises a zone CS which is described as follows:

System Layer Zone CS:
.const: for reference;
.var: empty (the past is stored in the segment var of the zone PU);
.inst: the instructions for the graph executor, for managing the message boxes, for making available the passed values of the streams of time variables, and the instructions for managing the clocks and calculating due times.

The transfer zone TR common to the system layer is described as follows:

Transfer Time TR:
.const: for reference;
.var: the identity of the active task;
.inst: instructions for changing the hardware access right to the memory and for branching into the system layer or the micro-kernel.

The micro-kernel comprises zones MN and RS which are described as follows:

Zone MN:
.const: for reference;
.var: the data needed for managing hardware (managing time, managing "trap" instructions, . . . );
.inst: instructions for managing sets of ready or resting tasks as a function of due times, backing up and changing hardware context, managing clock interrupts for exhausted right to use the processor, and implementing the memory protection function available on the CPU.

Zone RS:
.const: for reference;
.var: empty;
.inst: instructions for initializing the CPU and the software which executes without memory protection.

At a given instant, the processor executes instructions either on behalf of a task in the application code (in non-privileged mode), or for a task in the system layer (in privileged mode), or in the micro-kernel.

The rows of the table of FIG. 14 represent, the segments of a task, then those of the system layer, and finally those of the micro-kernel, as defined above. The columns represent access rights to the memory depending on whether the processor is executing instructions of the application code of the task (column 301), code of the system layer for the task (column 302), code of the system layer for another task (column 303), or code of the micro-kernel after initialization of the CPU (column 304).

In general, the memory can be subdivided into pages, and a page can be write-protected, absent, or available. In this situation, segment sizes are rounded to multiples of one page, .const and .var are merged and write-protected, and pages whose access rights are R are either absent or else removed from the description.

The invention claimed is:

1. A security method making real time execution of multitask applications of the control and command type in a control system deterministic, the method comprising:
   at least a first clock that issues an interrupt signal sh whenever an adjustable quantity of time has elapsed;
   a CPU having at least one processor capable of receiving at least said clock interrupt signal sh;
   a main memory; and
   a set of controllers ($1_1$ to $1_N$) for controlling peripherals (1 to N) for managing inputs/outputs of the control system,
   the method being characterized in that it comprises the following steps:
   for each of the tasks of a given application, storing all of the chaining that is authorized from each time synchronization point of the task that requires a call to a system layer, said chaining being represented by a control graph for monitoring the execution of system layer calls made by the task in question, each control graph comprising a set of nodes each corresponding to a call to the system layer of the control system;
   for each node of the control graph of each task, storing the nature of the call to the system layer and its call parameters, including time parameters enabling "earliest start" times d(i) and "latest finish" times f(i) to be updated;

for each task, storing an initial node (Node 0) in the associated graph;

for the given application and prior to starting real time execution in a time-triggered mode, initializing, for each task, the initial node (Node 0) and the initial instant representing the initial state of the task in question;

for the given application and prior to starting real time execution in a time-triggered mode, initializing the starting order of each of the tasks by pre-ordering lists of tasks in an atomic micro-kernel;

setting the first clock to issue a clock interrupt signal sh constituting a call to the micro-kernel, on the first instant of the application for starting execution of said application in time-triggered mode;

during normal operation after the first clock has been set, causing the first clock to be reset by the micro-kernel on each call to the micro-kernel; during a call to the micro-kernel by the system layer or by processing the interrupt signal sh, causing the micro-kernel to go to the step of updating the lists of tasks in ordered manner depending on the time characteristics of the tasks, namely their earliest start times d(i) and their latest finish times f(i); and after updating the list, causing the micro-kernel to calculate the nearest future instant on which a task needs to be woken up and causing the first clock to be set by the micro-kernel on the basis of said nearest future instant to wake up said task and leave the micro-kernel; and while executing a task, making a call to the system layer only when a node of the control graph of said task is reached, and passing as an argument the number of the node; proceeding on entry into the system layer with a check to verify whether, according to the control graph of the task being executed, the chaining from the node corresponding to the preceding system layer call is authorized, in order to launch anomaly processing in the system layer if said chaining is not authorized or to continue with execution if said chaining is authorized, updating the time parameters of the task being executed comprising the earliest start time d(i) and the latest finish time f(i) using calls to the micro-kernel from the system layer, and continuing normal execution of the current task until said task again reaches a node of its control graph.

2. A control system implementing the security method in claim 1, further comprising a memory protection unit for controlling addressing access rights, which memory protection unit responds to a requested address ad supplied by the CPU and to the rights (C) of the execution context of the processor to access the addressable memory space, by producing in exclusive manner either a validated address av giving access, or else issuing an exception signal se to the CPU indicative of authorized addressing, and in that it further comprises the following steps:

during a preparatory stage, for a given application, storing the access rights to each of the memory segments for the micro-kernel and for each application task and for the extension of each task in the system layer so as to constitute first and second execution contexts depending on whether the instructions are in the code specific to the application constituting the task or the instructions are located in generic code of the system layer constituting the extension of the task in the system layer;

for a given application and prior to starting real time execution in a time-triggered operating mode, initializing the micro-kernel context and the first and second execution context for each task and for its extension in the system layer; and during execution of a task, making a call to the system layer using an instruction for passing into a privileged mode of execution which makes it possible to pass from the execution context of the task to the execution context of its extension in the system layer, and after verifying that chaining from the node corresponding to the preceding system call is authorized, and after updating the time parameters of the task using calls to the micro-kernel from the system layer, returning to the code of the task by means of an instruction for returning into the non-privileged mode enabling execution to pass from the execution context of the extension in the system layer to the execution context of the task.

3. A method according to claim 2, characterized in that the execution contexts of each application task are disjoint in pairs.

4. A method according to claim 2, characterized in that the extensions of the execution contexts of the application tasks into the system layer are not write accessible to the execution contexts of the tasks in the application code.

5. A method according to claim 1, characterized in that the coding of the control graph of a task prevents any failure of common cause occurring both in the mechanism for controlling execution of any task of the application and in the execution of said task itself.

6. A method according to claim 1, characterized in that it further comprises the following steps:

during a preparatory stage, for each given application, and for all of the authorized chainings in said task, storing a time quota constituting a supremum for the maximum execution time needed for going from one node to the other in the control graph of the task, each of these time quotas covering both the time passed in executing the instructions specific to the task, and also the time passed in executing the generic code of the system layer in the extension of the task; and during normal operation, after the first clock has been set, in the event of a call to the micro-kernel triggered by the time interrupt signal sh and causing the first clock to be reset, checking to verify whether the time interrupt signal sh triggering the call to the micro-kernel is associated with an attempt at violating a time quota, and if so, causing the micro-kernel to run anomaly processing, else if the time interrupt signal sh is not associated with an attempt to violate a time quota, causing the micro-kernel to update the task lists, and after updating the task lists, to calculate both the nearest future instants at which a task needs to be woken up and the future instants at which the quota of time allocated to the task that will be executing on exiting the micro-kernel will have expired, which time is determined while updating the lists, and causing the micro-kernel to set the first clock to the nearer of said future instants so that either the task is woken up or else an attempt at violating time quota due to anomalous operation is detected, and leaving the micro-kernel after setting the first clock.

7. A method according to claim 1, characterized in that a second clock is implemented, and in that the micro-kernel is caused to access the second clock to monitor the flows of time as triggered by the first clock by comparing the time signals.

8. A security method according to claim 1, causing the real time execution of communicating multitask applications of the control and command type to be made deterministic, the method being characterized in that it further comprises the following steps:

during a preparatory stage, for each of the tasks of a given application storing all of the authorized chainings of its points for time synchronization and for communication with the other tasks of the application requiring a call to the system layer, these authorized chaining being represented by a control graph for the execution of system layer calls made by the task in question, each graph comprising a set of nodes, each corresponding to a call to the system layer;

storing each buffer zone needed for exchanging data between tasks, specifying its size, the size of the elements that it contains, its location or base address, and also the relationships between the buffer zones enabling the information transfers needed for communications to be confirmed;

storing, for each buffer zone, the initial values of its elements;

for the given application and prior to starting real time execution in a time-triggering operating mode, initializing the values of the elements of the buffer zone with values previously stored in memory; and during execution of a task, while making a system layer call when a node of the task control graph is reached and after verifying that according to the control graph of the task currently being executed the chaining from the node corresponding to the preceding system layer call is authorized, causing buffer zones to be updated in succession as a function of the nature of the previously-stored call and performing incremental updates as necessary of the time parameters of the task being executed, comprising its earliest start time $d(i)$ and its latest finish time $f(i)$.

9. A method according to claim 2 for causing the real time execution of communicating multitask applications of the control and command type to be made deterministic, characterized in that during a preparatory stage, for each of the tasks of a given application storing all of the authorized chainings of its points for time synchronization and for communication with the other tasks of the application requiring a call to the system layer, these authorized chaining being represented by a control graph for the execution of system layer calls made by the task in question, each graph comprising a set of nodes, each corresponding to a call to the system layer;

storing each buffer zone needed for exchanging data between tasks, specifying its size, the size of the elements that it contains, its location or base address, and also the relationships between the buffer zones enabling the information transfers needed for communications to be confirmed;

storing, for each buffer zone, the initial values of its elements;

for the given application and prior to starting real time execution in a time-triggering operating mode, initializing the values of the elements of the buffer zone with values previously stored in memory; and during execution of a task, while making a system layer call when a node of the task control graph is reached and after verifying that according to the control graph of the task currently being executed the chaining from the node corresponding to the preceding system layer call is authorized, causing buffer zones to be updated in succession as a function of the nature of the previously-stored call and performing incremental updates as necessary of the time parameters of the task being executed, comprising its earliest start time $d(i)$ and its latest finish time $f(i)$; and further characterized in that in the system layer, only the buffer zones are allowed to be shared by the extensions of the execution contexts of the tasks of an application, a given buffer zone for dynamic communications corresponding to sending messages being sharable only by two task execution context extensions, while a given buffer zone for static communications corresponding to a stream of time-stamped data can be shared by more than two task execution context extensions, but can be written to or modified by a single context only.

10. A control and command system implementing the security method according to claim 1, further having a safety class level 1E, for a nuclear reactor.

11. A method according to claim 3, characterized in that the extensions of the execution contexts of the application tasks into the system layer are not write accessible to the execution contexts of the tasks in the application code.

12. A method according to claim 3, characterized in that:

the extensions of the execution contexts of the application tasks into the system layer are not write accessible to the execution contexts of the tasks in the application code;

the coding of the control graph of a task prevents any failure of common cause occurring both in the mechanism for controlling execution of any task of the application and in the execution of said task itself;

it further comprises the following steps:

during a preparatory stage, for each given application, and for all of the authorized chainings in said task, storing a time quota constituting a supremum for the maximum execution time needed for going from one node to the other in the control graph of the task, each of these time quotas covering both the time passed in executing the instructions specific to the task, and also the time passed in executing the generic code of the system layer in the extension of the task; and during normal operation, after the first clock has been set, in the event of a call to the micro-kernel triggered by the time interrupt signal sh and causing the first clock to be reset, checking to verify whether the time interrupt signal sh triggering the call to the micro-kernel is associated with an attempt at violating a time quota, and if so, causing the micro-kernel to run anomaly processing, else if the time interrupt signal sh is not associated with an attempt to violate a time quota, causing the micro-kernel to update the task lists, and after updating the task lists, to calculate both the nearest future instants at which a task needs to be woken up and the future instants at which the quota of time allocated to the task that will be executing on exiting the micro-kernel will have expired, which time is determined while updating the lists, and causing the micro-kernel to set the first clock to the nearer of said future instants so that either the task is woken up or else an attempt at violating time quota due to anomalous operation is detected, and leaving the micro-kernel after setting the first clock;

a second clock is implemented, and in that the micro-kernel is caused to access the second clock to monitor the flows of time as triggered by the first clock by comparing the time signals.

13. A security method according to claim 12, causing the real time execution of communicating multitask applications of the control and command type to be made deterministic, the method being characterized in that it further comprises the following steps:

during a preparatory stage, for each of the tasks of a given application storing all of the authorized chainings of its points for time synchronization and for communication with the other tasks of the application requiring a call to the system layer, these authorized chaining being represented by a control graph for the execution of system layer calls made by the task in question, each graph comprising a set of nodes, each corresponding to a call to the system layer;

storing each buffer zone needed for exchanging data between tasks, specifying its size, the size of the elements that it contains, its location or base address, and also the relationships between the buffer zones enabling the information transfers needed for communications to be confirmed;

storing, for each buffer zone, the initial values of its elements;

for the given application and prior to starting real time execution in a time-triggering operating mode, initializing the values of the elements of the buffer zone with values previously stored in memory; and during execution of a task, while making a system layer call when a node of the task control graph is reached and after verifying that according to the control graph of the task currently being executed the chaining from the node corresponding to the preceding system layer call is authorized, causing buffer zones to be updated in succession as a function of the nature of the previously-stored call and performing incremental updates as necessary of the time parameters of the task being executed, comprising its earliest start time d(i) and its latest finish time f(i).

* * * * *

UNITED STATES PATENT AND TRADEMARK OFFICE
CERTIFICATE OF CORRECTION

PATENT NO. : 7,299,383 B2
APPLICATION NO. : 10/416564
DATED : November 20, 2007
INVENTOR(S) : Vincent David et al.

It is certified that error appears in the above-identified patent and that said Letters Patent is hereby corrected as shown below:

Column 2, line 1, "sh" should read --s̲h̲--;

Column 2, line 5, "sh" should read --s̲h̲--;

Column 2, line 33, "sh" should read --s̲h̲--;

Column 2, line 41, "sh" should read --s̲h̲--;

Column 3, line 2, "ad" should read --a̲d̲--;

Column 3, line 5, "av" should read --a̲v̲--;

Column 3, line 6, "se" should read --s̲e̲--;

Column 3, line 59, "sh" should read --s̲h̲--;

Column 3, line 60, "sh" should read --s̲h̲--;

Column 3, line 64, "sh" should read --s̲h̲--;

Column 5, line 51, "sh" should read --s̲h̲--;

Column 5, line 54, "sh" should read --s̲h̲--;

Column 6, line 5, "ad" should read --a̲d̲--;

Column 6, line 11, "av" should read --a̲v̲--;

Column 6, line 14, "sc" should read --s̲c̲--;

Column 6, line 21, "sh" should read --s̲h̲--;

Column 6, line 22, "se" should read --s̲e̲--;

Column 7, line 19, "sh" should read --s̲h̲--;

Column 7, line 26, "sh" should read --s̲h̲--;

Column 8, line 38, "sh" should read --s̲h̲--;

Column 8, line 40, "sh" should read --s̲h̲--;

Column 8, line 43, "sh" should read --s̲h̲--;

Column 9, line 65, "v" should read --v̲--;

Column 10, line 7, "v" should read --v̲--;

UNITED STATES PATENT AND TRADEMARK OFFICE
CERTIFICATE OF CORRECTION

PATENT NO. : 7,299,383 B2
APPLICATION NO. : 10/416564
DATED : November 20, 2007
INVENTOR(S) : Vincent David et al.

It is certified that error appears in the above-identified patent and that said Letters Patent is hereby corrected as shown below:

Column 10, line 26, "v" should read --$\underline{v}$--;

Column 11, line 10, "i to Node j" should read --$\underline{i}$ to Node $\underline{j}$--;

Column 11, line 11, "i to Node j" should read --$\underline{i}$ to Node $\underline{j}$--;

Column 12, line 6, "v" should read --$\underline{v}$--;

Column 12, line 7, "v" should read --$\underline{v}$--;

Column 12, line 8, "v" should read --$\underline{v}$--;

Column 12, line 10, "v" should read --$\underline{v}$--;

Column 12, line 17, "v" should read --$\underline{v}$--;

Column 12, line 18, "v" should read --$\underline{v}$--;

Column 12, line 51, "v" should read --$\underline{v}$--;

Column 13, line 64, "i to Node j" should read --$\underline{i}$ to Node $\underline{j}$--;

Column 13, line 65, "i to Node j" should read --$\underline{i}$ to Node $\underline{j}$--;

Column 14, line 43, "sh" should read --$\underline{sh}$--;

Column 15, line 60, "segment var of" should read --segment .var of--;

Column 16, line 48, "sh" should read --$\underline{sh}$--;

Column 16, line 51, "sh" should read --$\underline{sh}$--;

Column 17, line 16, "sh" should read --$\underline{sh}$--;

Column 17, line 24, "sh" should read --$\underline{sh}$--;

Column 17, line 54, "ad" should read --$\underline{ad}$--;

Column 17, line 57, "av" should read --$\underline{av}$--;

Column 17, line 58, "se" should read --$\underline{se}$--;

Column 18, line 47, "sh" should read --$\underline{sh}$--;

Column 18, line 49, "sh" should read --$\underline{sh}$--;

Column 18, line 52, "sh" should read --$\underline{sh}$--;

UNITED STATES PATENT AND TRADEMARK OFFICE
CERTIFICATE OF CORRECTION

PATENT NO.         : 7,299,383 B2
APPLICATION NO. : 10/416564
DATED              : November 20, 2007
INVENTOR(S)        : Vincent David et al.

It is certified that error appears in the above-identified patent and that said Letters Patent is hereby corrected as shown below:

Column 20, line 47, "sh" should read --sh--;

Column 20, line 49, "sh" should read --sh--;

Column 20, line 52, "sh" should read --sh--;

Column 21, claim 13, line 8, "f or" should read --for--.

Signed and Sealed this

Fourteenth Day of April, 2009

JOHN DOLL
*Acting Director of the United States Patent and Trademark Office*